US011434120B2

(12) United States Patent
Hironaga

(10) Patent No.: US 11,434,120 B2
(45) Date of Patent: Sep. 6, 2022

(54) STAKE REMOVAL APPARATUS

(71) Applicant: Glenn Hironaga, Honolulu, HI (US)

(72) Inventor: Glenn Hironaga, Honolulu, HI (US)

( * ) Notice: Subject to any disclaimer, the term of this patent is extended or adjusted under 35 U.S.C. 154(b) by 0 days.

(21) Appl. No.: 17/329,130

(22) Filed: May 24, 2021

(65) Prior Publication Data

US 2021/0323801 A1 Oct. 21, 2021

Related U.S. Application Data

(63) Continuation-in-part of application No. 12/141,312, filed on Jun. 18, 2008, now abandoned.

(51) Int. Cl.
*A01B 1/16* (2006.01)
*B66F 15/00* (2006.01)
*B25C 11/00* (2006.01)

(52) U.S. Cl.
CPC .............. *B66F 15/00* (2013.01); *B25C 11/00* (2013.01)

(58) Field of Classification Search
CPC ................................. B66F 15/00; B25C 11/00
USPC ............................. 254/25, 30, 129, 131, 132
See application file for complete search history.

(56) References Cited

U.S. PATENT DOCUMENTS

| | | | | | |
|---|---|---|---|---|---|
| 4,454,792 | A * | 6/1984 | Burris | B25B 27/02 29/254 |
| 4,792,120 | A * | 12/1988 | Egaas | E02D 9/02 254/131 |
| 5,447,289 | A * | 9/1995 | Callahan | B25C 11/00 254/131 |
| 6,131,884 | A * | 10/2000 | Broussard | E04H 17/265 254/129 |
| D446,838 | S * | 8/2001 | Carey | D21/840 |
| 7,743,548 | B1 * | 6/2010 | Cashaw | A01K 97/11 43/21.2 |
| 9,637,867 | B2 * | 5/2017 | Burns | B66F 15/00 |
| 10,351,404 | B1 * | 7/2019 | Sanford | E04H 15/62 |

* cited by examiner

*Primary Examiner* — Joseph J Hail
*Assistant Examiner* — Shantese L McDonald
(74) *Attorney, Agent, or Firm* — Ariel S. Bentolila; Bay Area IP Group, LLC

(57) ABSTRACT

A system including means for supporting a foundation member or ancillary structure; means for driving said foundation member or ancillary structure supporting means to a ground; means for prying or removing said foundation member or ancillary structure supporting means driven into the ground; means for engaging at least one or more extension sections of said foundation member or ancillary structure supporting means; means for contacting said engaging means to remove said foundation member or ancillary structure supporting means that is driven into the ground area; means for manipulating said prying or removing means; means for providing support for said prying or removing means; means for providing support for said manipulating means; and means for providing a generally straight sliding contact.

19 Claims, 8 Drawing Sheets

STAKE REMOVAL APPARATUS

CROSS-REFERENCE TO RELATED APPLICATIONS

The present continuation-in-part patent application claims priority benefit under 35 U.S.C. 120 of the U.S. nonprovisional patent application Ser. No. 12/141,312, entitled "STAKE PULLING TOOL", file on 18 Jun. 2008. The contents of this related patent application is incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to stakes, posts, rods, or the like which are driven or placed into the ground and devices which are used for removal of the stakes, posts, rods, or the like which have been driven or placed into the ground. More particularly, certain embodiments of the invention relate to stakes and stake pulling apparatus.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that in the construction industry in particular, it is frequently necessary to drive stakes into the ground to support foundation members and ancillary structures such as forms for forming foundations members from poured concrete. The stakes and posts may become very difficult to remove under most circumstances since they are generally directly pressing against the foundation members or the like, and thus when it is time to remove the stakes, it may be very difficult to get convenient access to exert forces for pulling the stakes from their locations. In light of this difficulty, it has become commonplace to remove foundation stakes by either breaking them off, or by hitting them repeatedly with hammers to loosen the grip of surrounding ground, or by further driving them into the ground and leaving them to rot away over time. Such procedures increase construction costs due to additional time required, and further result in loss of the stakes, which if recovered could be utilized in subsequent construction.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
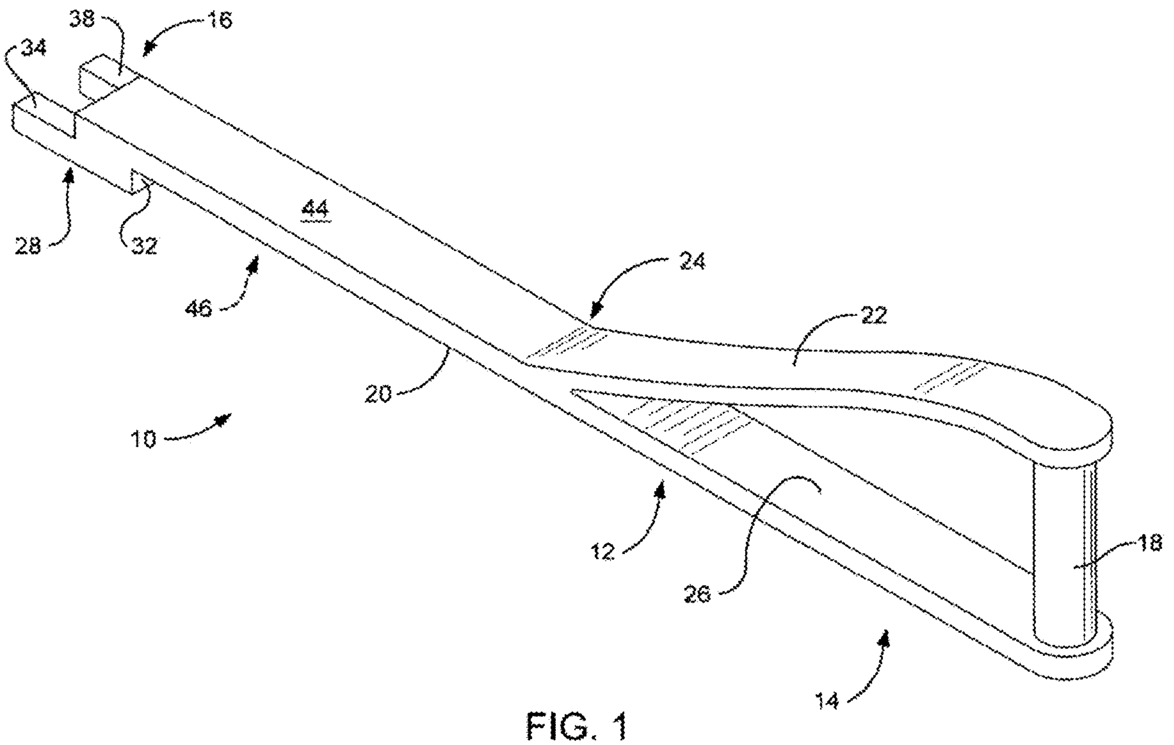
FIG. 1 is a perspective view of a stake pulling apparatus according to at least one aspect of the invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like.

It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms.

Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other. It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

This application discloses an apparatus which may facilitate an extraction of a special purpose stake which has been driven into the ground. The disclosed apparatus is economical to produce, of uncomplicated construction, and capable of mass production.

More particularly, this application discloses a special purpose stake pulling apparatus for pulling a stake in an upward direction relative from the ground. The apparatus may have at least two different and distinct engagement surfaces for engaging a special purpose stake in order to impose pulling forces thereto. The disclosed apparatus may be operated in several ways, including in the manner of a manual lever and as a manual prying apparatus. Even further, the several different and distinct engagement surfaces enable engagement of the driven special purpose stake in more than one position of the apparatus, thereby increasing apparatus versatility and convenience to personnel charged with removing the special purpose stakes. This versatility enables most stakes to be conveniently extracted without requiring specialized apparatus beyond that of the present application.

It is therefore an object of the invention to provide a manual stake pulling apparatus which can conveniently extract special purpose stakes which have been driven into the ground at foundation sites.

It is another object of the invention to provide a manual stake pulling apparatus which can operate either in the manner of a lever or alternatively as a prying apparatus.

A further object of the invention is to provide a manual stake pulling apparatus which affords at least two or more different orientations in engaging a special purpose stake to be extracted from the ground.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

The present invention will now be described in detail with reference to embodiments thereof as illustrated in the accompanying drawings.

FIG. 1 shows a stake pulling apparatus 10 according to at least one aspect of the invention. Apparatus 10 is intended for pulling a generally T-shaped stake 2 by the T-shaped head thereof (see FIG. 2). As used herein, "stake" encompasses any like devices that can be driven into the ground, which may have enlarged heads.

Stake pulling apparatus 10 may comprise principal member 20, handle end 14 and working end 16. Principal member 20 may comprise two divergent members including elongated body 12 and minor member 22. Minor member 22 may be fixed to principal member 20 at divergent joint 24.

Elongated body 12 and minor member 22 each have respective free ends, with handle 18 spanning the free ends. Cylindrical handle 18 may be connected transversely to handle end 14 of elongated body 12 and free end of minor member 22. Handle 18 may be cylindrical along at least part of its length, whereby handle 18 is comfortably grasped by hand. Elongated body 12, minor member 22, and handle 18 collectively form a peripherally closed passageway or opening 26. Elongated body 12 may form a substantial straight line with principal member 20 while minor member 22 is generally curved and shaped to form opening 26, the purpose of which will be explained hereinafter.

Figure 3:
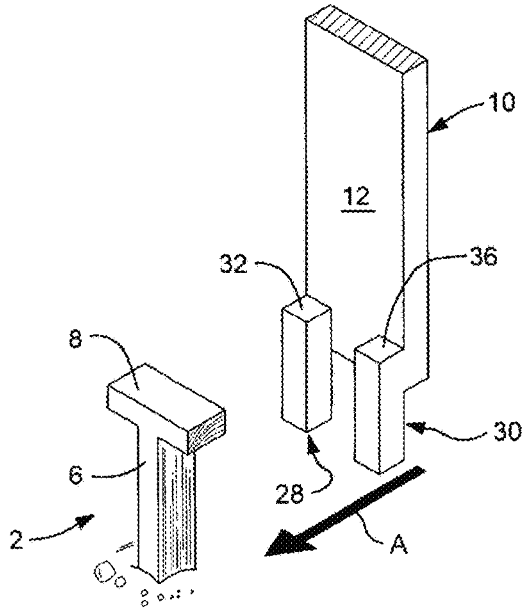
FIG. 3 is an environmental perspective detail view showing engagement of a broad head of a stake by the apparatus of FIG. 1, shown with the apparatus spaced apart from the stake.

At working end 16, stake pulling apparatus 10 includes a first engagement member 28 and a second engagement member 30 (see FIG. 3) fixed to principal member 20 at a surface forming the substantially straight-line with elongated body 12. As will be further explained hereinafter, first and second engagement members 28 and 30 engage the T-shaped head of the special purpose stake being pulled from the ground. As seen in FIG. 1 and FIG. 3, first engagement member 28 is generally parallel to second engagement member 30 having a gap in-between that is configured to accommodate a shaft of the special purpose stake. First engagement member 28 may have first contact surface 32 for slidably engaging the special purpose stake and a second contact surface 34 for engaging the special purpose stake when apparatus 10 is positioned as a lever (see FIG. 5). Similarly, second engagement member 30 may have a third contact surface 36 for slidably engaging the special purpose stake and a fourth contact surface 38 when apparatus 10 is positioned as a lever. It will be seen that first contact surface 32 of first engagement member 28 and third contact surface 36 of second engagement member 30 configured to slidably pry the stake from the ground face handle 18 (see FIG. 4). In use, a user holds handle 18, aligns principal member 20 with the shaft of the special purpose stake, place first and second engagement members 28 and 30 under the T-shaped stake head, and slidably pull apparatus 10 upwards to dislodge the special purpose stake.

Principal member 20, elongated body 12, minor member 22, first engagement member 28, and second engagement member 30 may be fabricated from one or more suitable sturdy materials such as steel. Handle 18 may be fabricated from for example wood, plastic, or steel. Handle 18 may comprise, but not limited to textured rubber or silicone handles to provide a good grip, reduce the effort needed to use stake removal apparatus 10 effectively, and prevent stake removal apparatus 10 from slipping out of the hand.

Figure 2:
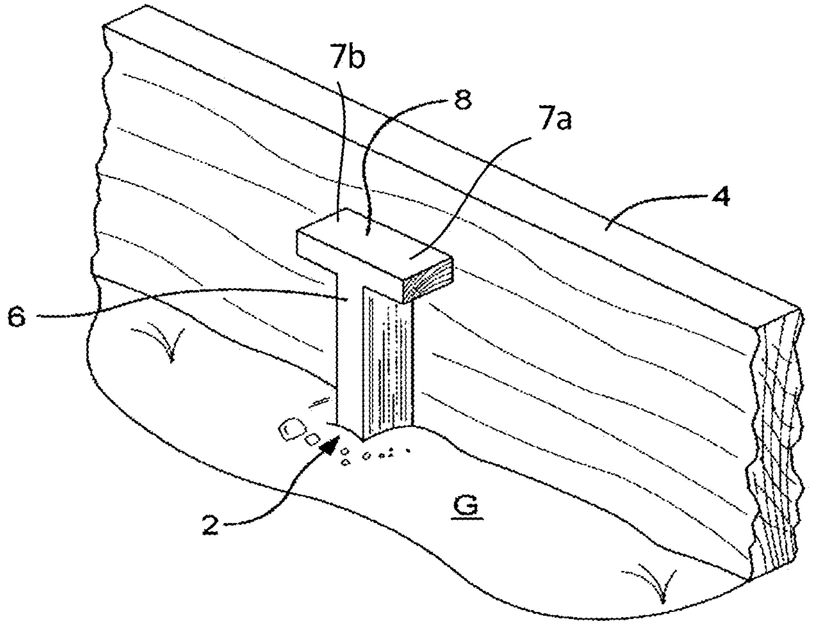
FIG. 2 is a perspective view of the environment of the problem which is solved by the present invention.

FIG. 2 shows an exemplary use of the special purpose stake in accordance with an embodiment of the present invention. T-shaped stake 2 is shown driven in close proximity to a foundation member 4. T-shaped stake 2 may comprise a shaft 6 and stake head 8 perpendicular to shaft 6, and is driven into the ground G such that ready removal by hand may be difficult if not impossible. Shaft 6 and stake head 8 with extended portions 7*a* and 7*b* may form the generally T-shaped stake, the extended portions 7*a* and 7*b* engaging first and second engagement members 28 and 30. Shaft 6 may be, but not limited to, square, rectangular, triangular, circular, etc. Stake head 8 may be disposed on one end of shaft 6. Shaft 6 and stake head 8 may be, but not limited to, welded, bonded, soldered, or fused together during manufacture. Stake head 8 may be, but not limited to, square or rectangular with extended portions 7*a* and 7*b* which may comprise of, but not limited to, more or less ⅜" inch extending portion measured from an outer surface of shaft 6. Shaft 6 and stake head 8 may comprise of, but not limited to, more or less ¾" inch thickness, where stake head 8 is flushed with shaft 6.

FIG. 3 shows one method of using stake pulling apparatus 10 (not shown in its entirety in FIG. 3) in accordance to another aspect of the invention. With principal member 20 in a substantially vertical orientation, stake pulling apparatus 10 is moved in the direction of the arrow A until respective contact surfaces 32 and 36 are below stake head 8.

It should be noted at this point that orientational terms such as up and down, left and right, and others refer to the drawing as viewed by an observer. Terms such as vertical and horizontal are relative to the field of gravity.

With contact surfaces 32 and 36 straddling shaft 6, stake pulling apparatus 10 is then raised until the contact surfaces 32 and 36 abut the underside of the stake head extended portions 7*a* and 7*b*. If minor upward pressure cannot dislodge stake 2 from the ground, then apparatus 10 may be accelerated while raising to the point that an impact is imposed on extended portions 7*a* and 7*b* when contact between stake pulling apparatus 10 and stake head 8 occurs. Alternatively stated, with engagement members 28 and 30 straddling or forking shaft 6 of stake 2, stake pulling apparatus 10 may be utilized in the manner of a lever.

Figure 4:
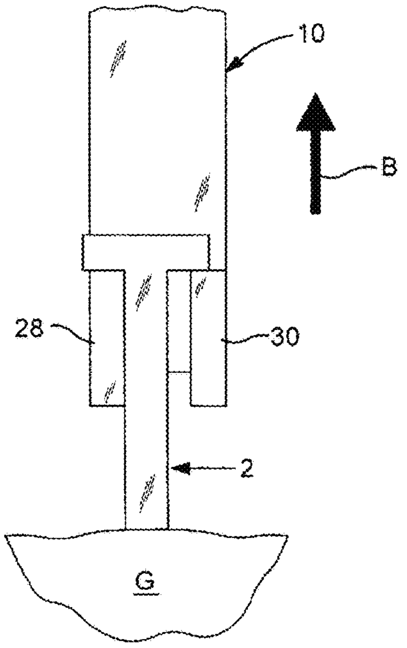
FIG. 4 is an end elevation of FIG. 3.

In use, FIG. 4 shows the engagement of stake pulling apparatus 10, which is being moved upwardly in the direction of arrow B, with stake 2 at the moment of mutual abutment. One or more upward blows with stake pulling apparatus 10 may be required to break T-shaped stake 2 free of engagement with ground G.

Figure 5:
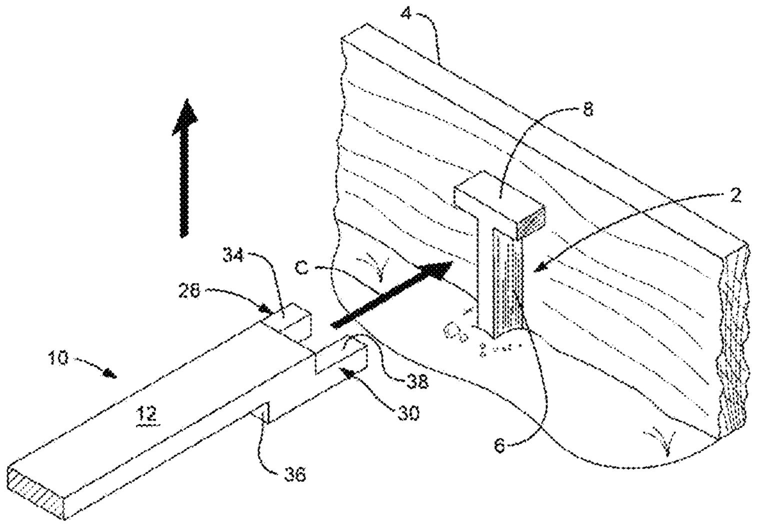
FIG. 5 is an environmental perspective detail view showing engagement of a broad head of a stake by the apparatus of FIG. 1 but illustrating a second orientation of the apparatus to the stake, shown with the apparatus spaced apart from the stake.
Figure 6:
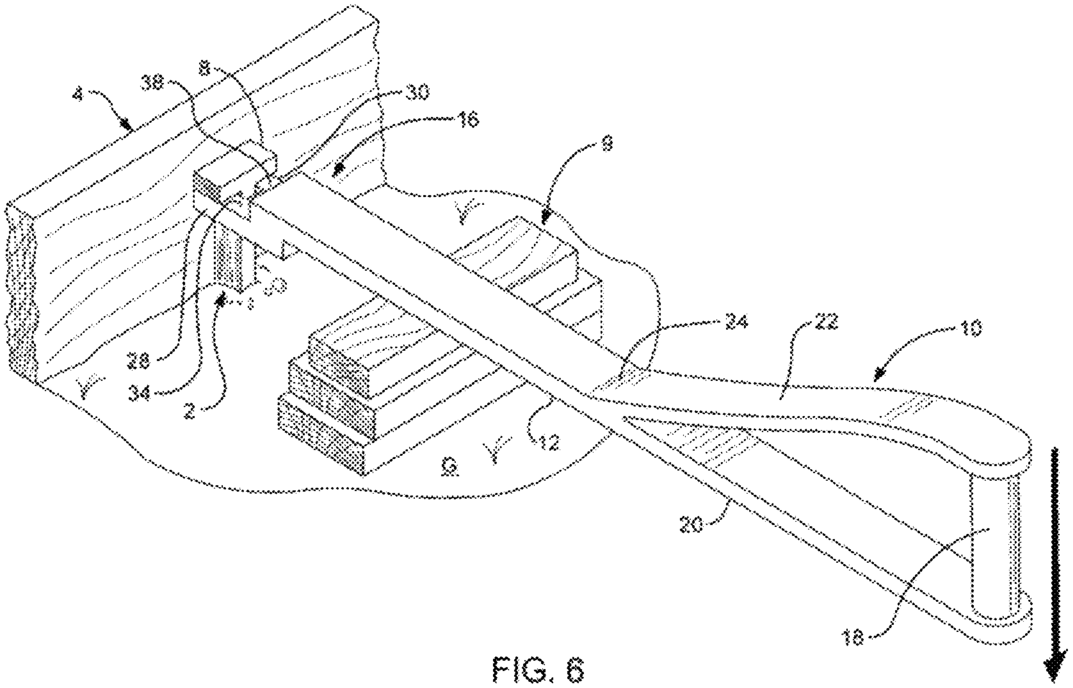
FIG. 6 is an environmental perspective view showing engagement of the apparatus of FIG. 1 as it may be employed as a prying apparatus.

Turning now to FIG. 5, another method of using stake pulling apparatus 10 is shown in accordance with another embodiment of the present invention. Stake pulling apparatus 10, again not shown in its entirety, straddles or forks shaft 6 of stake 2. Stake pulling apparatus 10 is moved in the direction of arrow C into straddling or forked relation to shaft 6. In the orientation of FIG. 5, contact surfaces 34 and 38 of respective engagement members 28 and 30 are used in place of contact surfaces 32 and 36 which were employed in the mode of use depicted in FIG. 4. Although impacts may be applied as described in the alternative orientation above, if feasible, the mode of FIG. 5 is also well suited to using apparatus 10 as a lever prying apparatus. This is shown in FIG. 6, wherein stake pulling apparatus 10 is positioned with elongated body 12 lying on any suitable material which can serve as a fulcrum, such as a stack 9 of lumber. When handle end 14 of stake pulling apparatus 10 is moved downwardly, as indicated by arrow D, an upwardly acting force is exerted at working head 16. With engagement members 28 and 30 contacting enlarged head 8, more specifically contact surfaces 34 and 38 respectively, of stake 2, stake 2 is subjected to lifting forces which will extract T-shaped stake 2 from ground G.

It will be appreciated that the geometry which enables these different modes of use may include the following characteristics. Firstly, principal member 20 has a length, first engagement member 28 has a length aligned with the length of principal member 20, and second engagement member 30 also has a length aligned with the length of principal member 20. Secondly, first contact surface 32 of first engagement member 28 is generally perpendicular to second contact surface 34 of first engagement member 28, and third contact surface 36 of second engagement member 30 is generally perpendicular to fourth contact surface 38 of second engagement member 30. In one embodiment, first contact surface 32 of first engagement member 28 and third contact surface 36 of second engagement member 30 may comprise generally flat and smooth surfaces. In another embodiment, first contact surface 32 of first engagement member 28 and third contact surface 36 of second engagement member 30 may comprise generally flat and rough surfaces. In some embodiment, first contact surface 32 of first engagement member 28 and third contact surface 36 of second engagement member 30 may comprise but not limited to generally flat, inclined, smooth and/or rough surfaces.

Thirdly, because engagement members 28 and 30 may be parallel to one another, it follows that first contact surface 32 and third contact surface 36 may be coplanar with one another. Similarly, second contact surface 34 and fourth contact surface 38 may be coplanar with one another. First contact surface 32 and third contact surface 36 are not parallel to second contact surface 34 and fourth contact surface 38. Rather, first contact surface 32 and third contact surface 36 may be perpendicular to second contact surface 34 and fourth contact surface 38, as occurs with stake pulling apparatus 10. These relationships assure that special purpose stake head 8, where formed by a linear board, will be simultaneously and evenly contacted by stake pulling apparatus 10 during extraction.

Referring back to FIG. 1, principal member 20 and elongated body 12 forming a generally straight line may have a substantially planar first flat face 44 and an opposed planar second flat face 46. Both first contact surface 32 of first engagement member 28 and third contact surface 36 of second engagement member 30 are perpendicular to planar first flat face 44 of elongated body 12. It will be seen that a hypothetical plane may be considered to exist parallel to and between faces 44 and 46. This plane, which may be coincident with first flat face 44 or with second flat face 46 as well as being located between flat faces 44 and 46, may be regarded as a dividing plane which separates flat faces 44 and 46.

Handle 18 and diverging minor member 22 may be located on one side of the hypothetical dividing plane, with engagement members 28 and 30 located on the opposite side of the hypothetical dividing plane. This arrangement assures that principal member 20 and elongated body 12 will be left with a straight section available for sliding contact with T-shaped stake 2 when apparatus 10 is used in the manner described with respect to FIGS. 3 and 4. This enables stake pulling apparatus 10 to be accelerated along a straight line while sliding against T-shaped stake 2 so that a significant impact may be generated upon contact of first engagement member 28 and second engagement member 30 with stake head 8.

Figure 7:
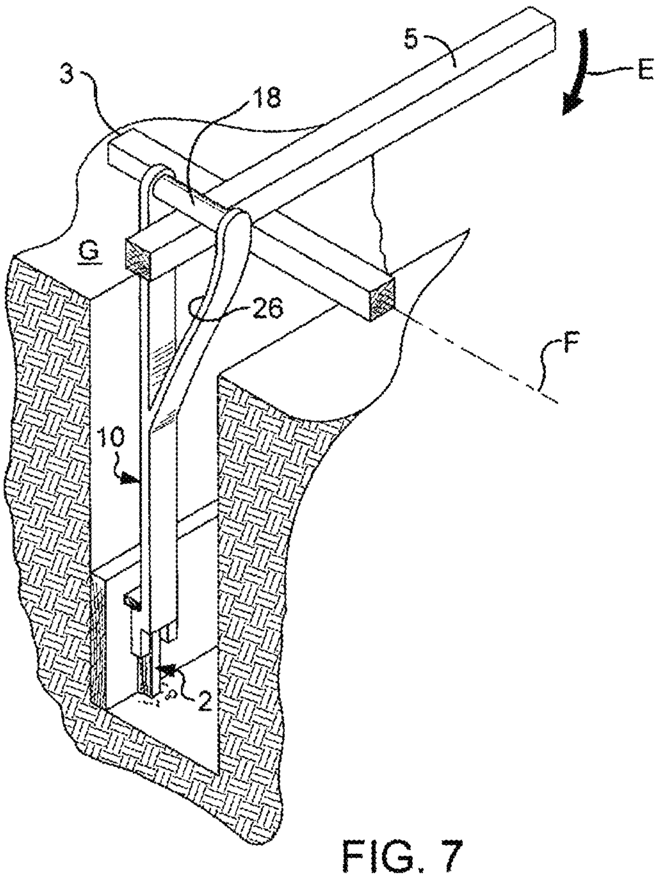
FIG. 7 is an environmental perspective view showing another arrangement for using the apparatus of FIG. 1 as a prying apparatus.

FIG. 7 depicts a further way of using stake pulling apparatus 10. In cases wherein stake 2 is contained within a well, trench, or other recess such that direct access is not possible, stake pulling apparatus 10 may be employed as shown. Stake pulling apparatus 10 may be placed into engagement with stake head 8, as was described with respect to FIGS. 3 and 4. A board 3 may be placed on ground G such that a second board 5 may be placed as shown. Board 5 acts as a lever, using board 3 as a fulcrum. Board 5 passes through passageway 26 of stake pulling apparatus 10. When a downward force (represented as an arrow E) is imposed on one end of board 5, an increased upwardly acting force on the other side of axis F of pivot is imposed on handle 18 of apparatus 18. This upward force is transmitted by stake pulling apparatus 10 to stake 2, which is thereby extracted.

Other ways of utilizing apparatus 10 exist. It may be possible for example to extract stakes which lack a T-shaped head such as T-shaped stake 2. Using a suitable apparatus such as a collar (not shown), which when placed over the stake and subjected to pulling forces grips the stake due to a sideward bias, may enable apparatus 10 to impose pulling forces and impacts on a stake in the absence of an enlarged head.

An apparatus according to other aspects of the invention may display variations of and modifications to the characteristics of the apparatus 10 as shown and described. For example, elongated body 12 of apparatus 10 may, instead of the flattened slab-like configuration shown, be tubular, square, formed from a stock channel configured as a "U", or otherwise configured in cross section. The diverging minor member 22 may form a mirror image with the corresponding section of principal member 20.

Figure 8A:
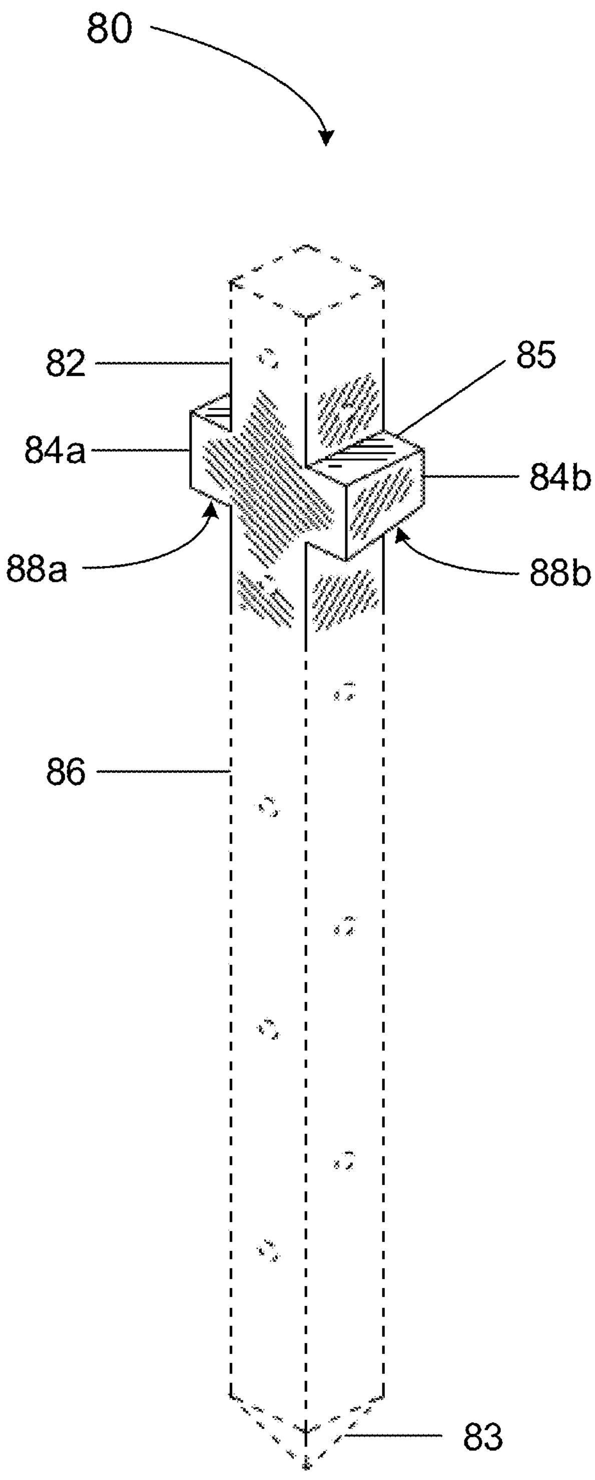
FIGS. 8A-8G is a perspective view of a square stake in accordance with an alternative embodiment of the invention.

FIGS. 8A-8G is a perspective view of a special purpose cross-shaped square stake in accordance with an alternative embodiment of the invention. FIG. 8A shows a 3-D view of a generally cross-shaped square stake 80. Cross-shaped square stake 80 comprises approximately square upper shaft 82 and lower shaft 86, stake head 85 having first extension section 84*a* and second extension section 84*b*, pointed area 83, and sections 88*a* and 88*b*. In some embodiment, sections 88*a* and 88*b* may comprise angled surfaces at around 15 degrees incline. Stake 80 may be driven into the ground to support foundation members and ancillary structures such as forms for forming foundations members from poured concrete. The first extension section 84*a* and second extension section 84*b* of stake head 85 may be aligned in one plane with the stake so as to easily slide and flush against a surface of the foundation member. For example, see FIG. 5. Upper shaft 82 and lower shaft 86 may comprise more or less than ¾" inch thickness on both sides. Stake head 85 having extension sections 84*a* and 84*b* may be positioned about 2" inches below the topmost end of upper shaft 82 where upper shaft 82 and lower shaft 86. In some embodiment, upper shaft 82 and lower shaft 86 may comprise but not limited to rectangular shaft. Extension sections 84*a* and 84*b* may extend for more or less than ⅜" inch and may be placed at more or less than 2" inches from a top section of upper shaft 82 and forms a cross shape with upper shaft 82 and lower shaft 86. Alternatively, section 88*a* may have an angled surface and section 88*b* have a flat surface or section 88*b* may have an angled surface and section 88*a* have a flat surface.

Figure 8B:
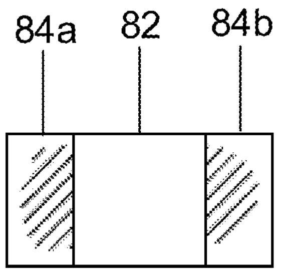
Figure 8C:
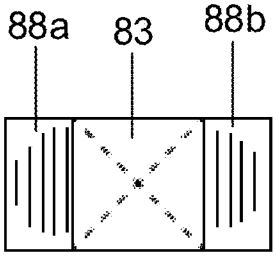
Figures 8D, 8E:
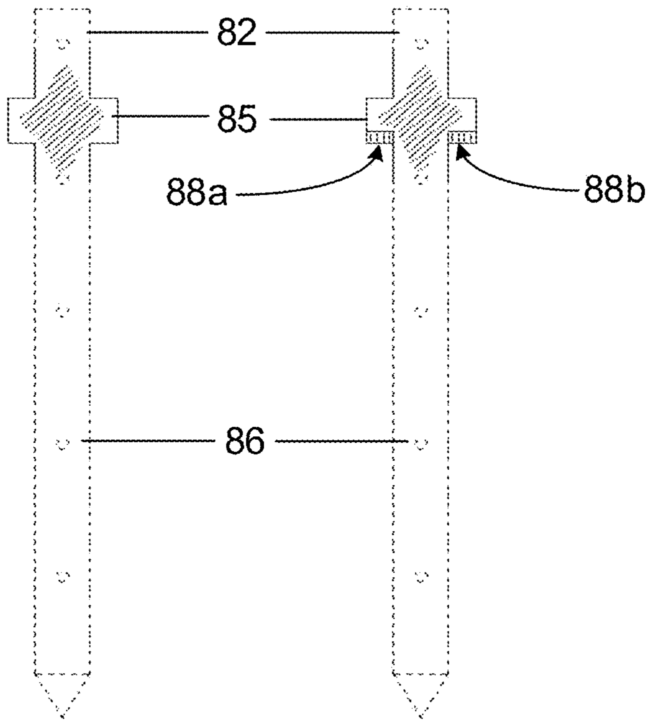
Figures 8F, 8G:
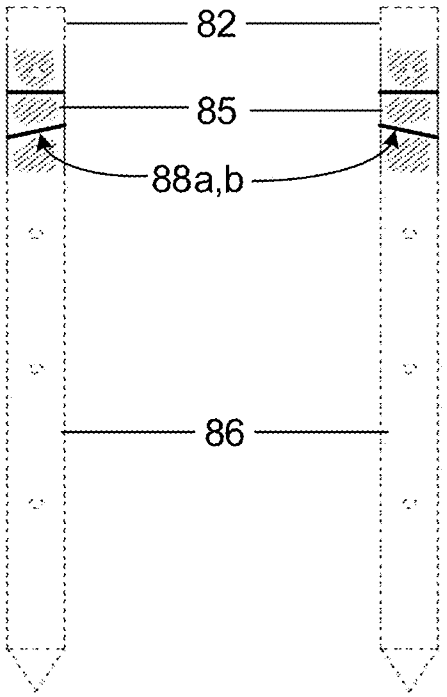

FIG. 8B is a top view of the special purpose square cross-shaped stake showing top portions of upper shaft 82 and extended sections 84*a* and 84*b*. FIG. 8C is a bottom view showing pointed area 83 and a bottom portion of extension sections 84*a* and 84*b*, which are angled portion 88*a* and 88*b*. FIG. 8D is a front view of generally cross-shaped square stake 80 and FIG. 8E is a back view of cross-shaped square stake 80, showing angled portions 88*a* and 88*b*. FIG. 8F is a right side view and FIG. 8G is a left side view of cross-shaped square stake 80 showing side views of angled sections 88*a* and 88*b* where the surfaces of angled portions 88*a* and 88*b* are flushed with the surface of upper shaft 82 and lower shaft 86.

Figure 9A:
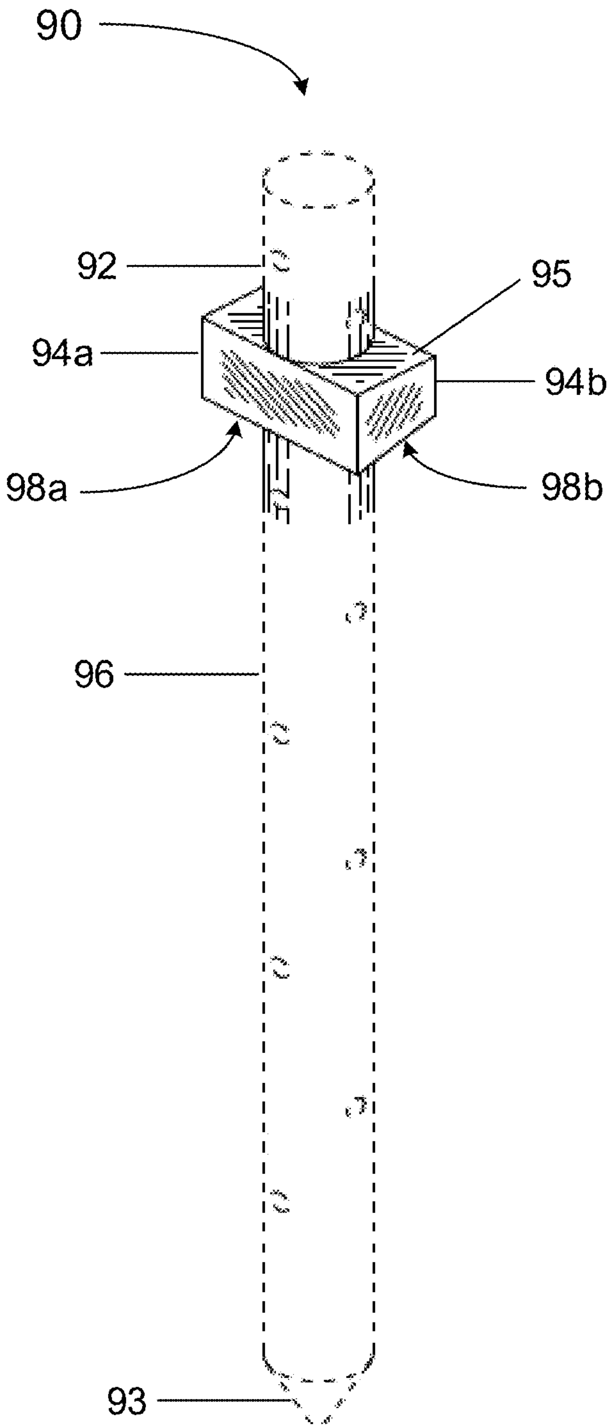
FIGS. 9A-9G is a perspective view of a round stake in accordance with another alternative embodiment of the invention.

FIGS. 9A-9G is a perspective view of a special purpose cross-shaped round stake 90 in accordance with an alternative embodiment of the invention. FIG. 9A shows a 3-D view of generally cross-shaped round stake 90. Cross-shaped round stake 90 comprises approximately round upper shaft 92 and lower shaft 96, extended sections 94*a* and 94*b*, pointed area 93, and portions 98*a* and 98*b* having angles surfaces. Upper shaft 92 and lower shaft 96 may comprise more or less than ¾" inch diameter. Alternatively, upper shaft 92 and lower shaft 96 may comprise but not limited to a proximately oblong shaped shaft. Extended sections 94*a* and 94*b* may extend for more or less than ⅜" inch and may be placed at more or less than 2" inches from a top section of upper shaft 92 and thereby form a cross shape with upper shaft 92 and lower shaft 96. Alternatively, section 98*a* may have an angled surface and section 98*b* have a flat surface or section 98*b* may have an angled surface and section 98*a* have a flat surface.

Figure 9B:
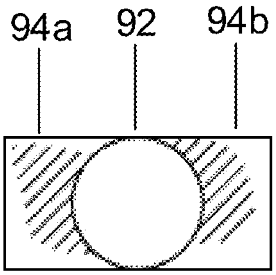
Figure 9C:
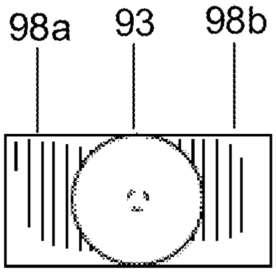
Figures 9D, 9E:
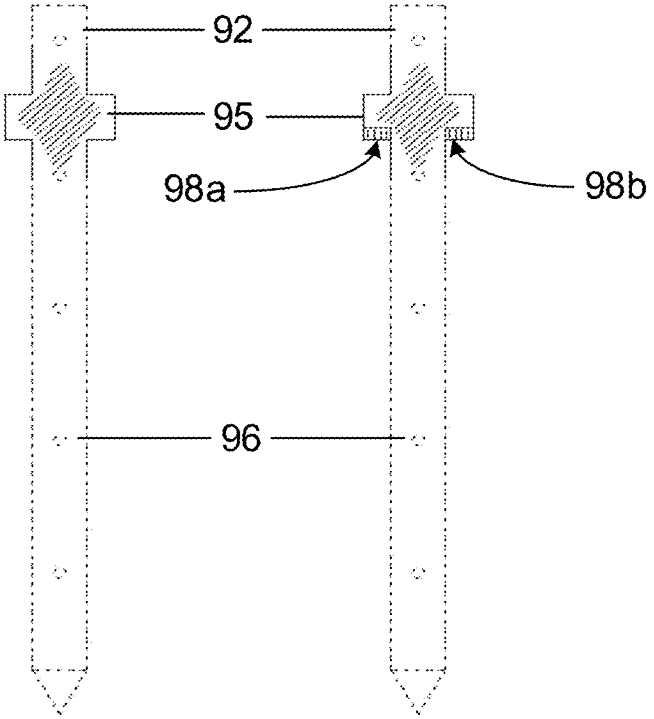
Figures 9F, 9G:
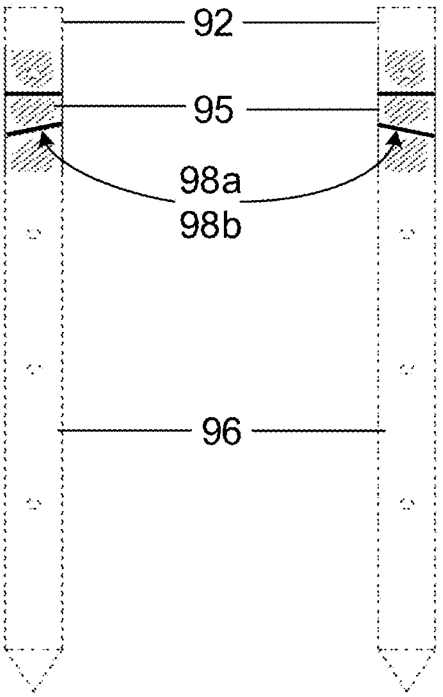

FIG. 9B is a top view of the special purpose cross-shaped round stake showing top portions of upper shaft 92 and extended sections 94*a* and 94*b*. FIG. 8C is a bottom view showing pointed area 93 and a bottom portion of extended sections 94*a* and 94*b* which are angled portions 98*a* and 98*b* respectively. FIG. 9D is a front view of cross-shaped round stake 90 and FIG. 8E is a back view of cross-shaped round stake 90, showing angled portions 98*a* and 98*b*. FIG. 9F is a right-side view and FIG. 9G is a left side view of cross-shaped round stake 90 showing side views of angled sections 98*a* and 98*b* where the surfaces of angled sections 98*a* and 98*b* are flushed with the surface of upper shaft 92 and lower shaft 96.

Figures 10A, 10B:
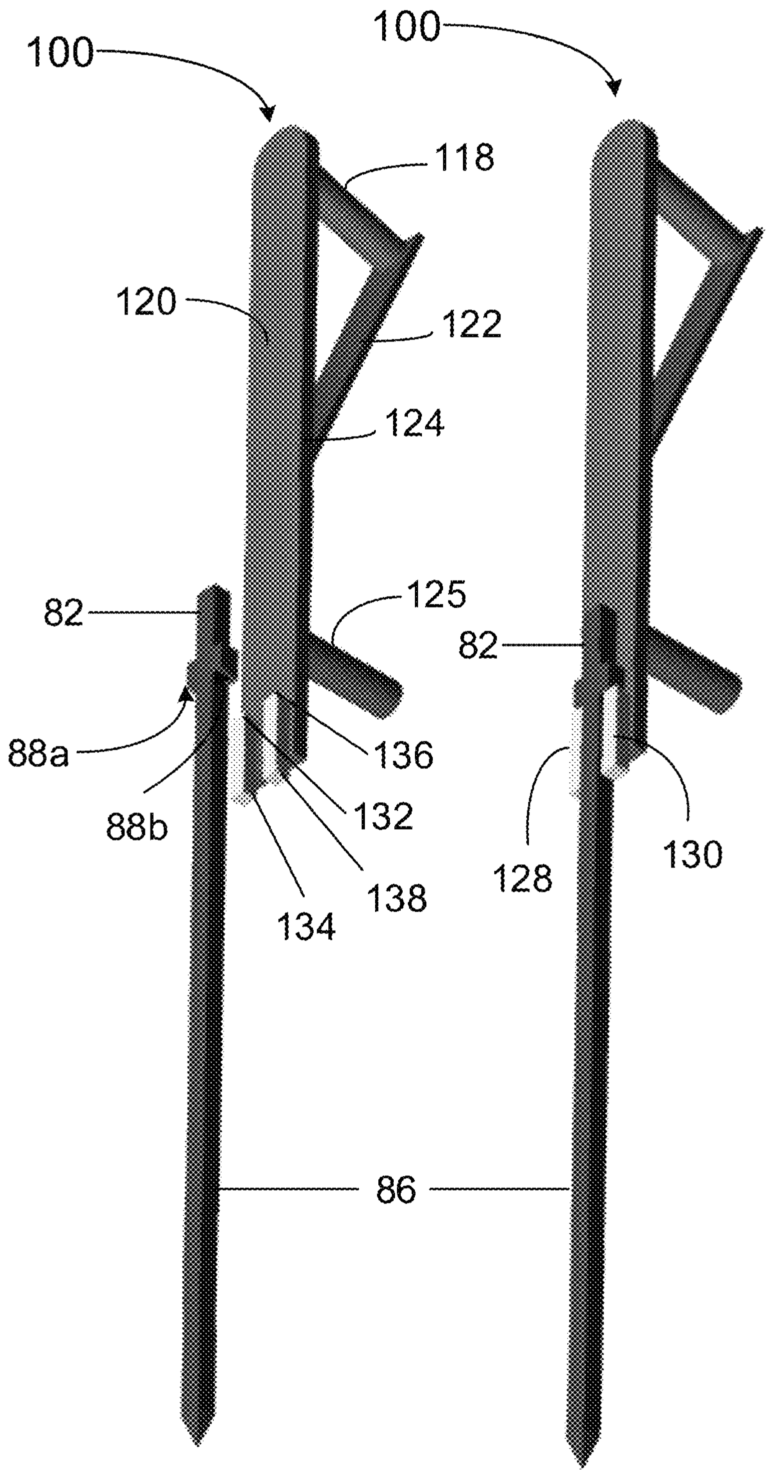
FIGS. 10A-10B is an environmental perspective detail view of a system showing an alternative apparatus engagement method, in accordance with an embodiment of the invention.

FIGS. 10A-10B is an environmental perspective detail view of a system showing engagement of special purpose cross-shaped square stake 80 with improved stake removal apparatus 100, in accordance with an embodiment of the invention. Referring to FIG. 10A, a released arrangement of cross-shaped square stake 80 and improved stake removal apparatus 100 is shown, such as when cross-shaped square stake 80 is driven in the ground. Stake 80 may become very difficult to remove since they are generally directly pressing against foundation members or the like, and thus when it is time to remove the stakes, it may be very difficult to get convenient access to exert force for pulling the stakes from their locations. Accordingly, an interlocking arrangement or action provided by improved stake removal apparatus 100 eases the burden of requiring convenient access for the removal of stakes driven into the ground supporting foundation members of the like.

Referring to FIG. 10A and FIG. 10B, improved stake removal apparatus 100 may comprise principal member 120 with a handle end, a prying end and forming a substantially planar straight line. Improved stake removal apparatus 100 may further comprise handle contrivance 118 for manipulating the apparatus, handle supporting member 122 for keeping the handle in place, divergent joint 124 for connecting the handle support member to principal member 120, auxiliary handle 125, first engagement member 128 and second engagement member 130 configured to be operable for removing a stake driven into the ground to support foundation members and/or ancillary structures. First engagement member 128 may comprise first impact surface 132 and first lever contact surface 134. Second engagement member 130 may comprise second impact surface 136 and second lever contact surface 138. In some embodiment, first impact surface 132 second impact surface 136 may comprise wedged impact surfaces generally matching the angled surfaces of sections 88*a* and 88*b*. First wedged impact surface 132 is configured to engage angled section 88*a* while second wedged impact surface 136 is configured to engage angled section 88*b* in an interlocking arrangement by virtue of their wedged and/or angled structures. Handle 118, handle supporting member 122, divergent joint 124, and auxiliary handle 125 may be situated to one side of principal member 120, with engagement members 128 and 130 may be situated on the other side of principal member 120. This arrangement assures that principal member 120 will be left with a straight section available for sliding contact with cross-shaped stake 80 when improved stake removal apparatus 100 is used in the manner described with respect to FIGS. 3 and 4. This enables stake removal apparatus 100 to be accelerated along a straight line while sliding against cross-shaped stake 80 so that a significant impact may be generated upon contact of first engagement member 128 and second engagement member 130 with extended sections 84*a* and 84*b* of cross-shaped stake 80.

Main handle 118 may provide grip support while auxiliary handle 125 may provide additional grip support. Main handle 118 and auxiliary handle 125 may comprise, but not limited to textured rubber, silicone, leather, and/or foam handles to provide a good grip, reduce the effort needed to use stake removal apparatus 100 effectively, and prevent stake removal apparatus 100 from slipping out of the hand. Alternatively, auxiliary handle 125 may be removable or taken out.

Referring to FIG. 10B, an interlocking arrangement of special purpose cross-shaped square stake 80 and improved stake pulling apparatus 100 is shown, such as, but not limited to when cross-shaped square stake 80 is being pulled out of the ground. Angled section 88*a* may engage first wedged contact surface 132 and angled section 88*b* may engage second wedged contact surface 136 to form the interlocking arrangement of angled sections 88*a* and 88*b* with first and second wedged contact surfaces 132 and 136 respectively. First and second engagement members 128 and 130 may guide lower shaft 86 during a sliding upward movement of improved stake pulling apparatus 100 to break cross-shaped square stake 80 free of engagement with the ground. The length of upper shaft 82 may provide additional support by preventing a breaking of the interlocking arrangement.

Other ways of utilizing apparatus 100 exist. It may be possible for example to extract stakes which lack a cross-shaped head such as cross-shaped stake 80 or 90. Using a suitable apparatus such as a collar (not shown), which when placed over the stake and subjected to pulling forces grips the stake due to a sideward bias, may enable apparatus 100 to impose pulling forces and impacts on a stake in the absence of an enlarged head.

An apparatus according to other aspects of the invention may display variations of and modifications to the characteristics of the apparatus 100 as shown and described. For example, principal member 120 of apparatus 100 may, instead of the flattened slab-like configuration shown, be tubular, square, formed from a stock channel configured as a "U", or otherwise configured in cross section.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing the combination stake and stake pulling apparatus according to the present invention will be apparent to those skilled in the art. Various aspects of the invention have been described above by way of illustration, and the specific embodiments disclosed are not intended to limit the invention to the particular forms disclosed. The particular implementation of the combination stake and stake pulling apparatus may vary depending upon the particular context or application. By way of example, and not limitation, the combination stake and stake pulling apparatus described in the foregoing were principally directed to construction industry implementations; however, similar techniques may instead be applied to rock climbing or fisheries industry, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A system comprising:

a special purpose stake, said special purpose stake is configured to be driven into the ground to support a foundation member or ancillary structure, in which said special purpose stake comprises:

at least a shaft section;

at least a head portion; and wherein said head portion comprises at least one or more extension sections;

a special purpose stake removal apparatus having a principal member, in which said principal member comprises:

a prying end;
a first side;
a second side;
a handle end; and
a handle contrivance;

a first engagement member, said first engagement member comprises:
at least a first impact surface; and
a first lever contact surface;

a second engagement member, said second engagement member comprises:
at least a second impact surface; and
a second lever contact surface;

wherein said first impact surface is configured to contact said at least one or more stake head extension sections to remove a special purpose stake that is driven into the ground;

wherein said second impact surface is configured to contact said at least one or more stake head extension sections to remove said special purpose stake that is driven into the ground;

wherein said first lever contact surface is configured to contact said at least one or more stake head extension sections to remove said special purpose stake that is driven into the ground;

in which said special purpose stake further comprises at least one of a T-shaped stake and a cross-shaped stake, and, wherein said first engagement member and said second engagement member are located on said first side of said principal member, and said handle contrivance being located only on said second side of said principal member.

2. The apparatus according to claim 1, wherein said first engagement member and said second engagement member are located at said prying end and first side of said principal member.

3. The apparatus according to claim 2, further comprising a handle contrivance connected transversely to said handle end and second side of said principal member, wherein said handle contrivance is at least partially cylindrical along its length, wherein said principal member is left with a straight section available for sliding contact with said cross-shaped stake and/or T-shaped stake.

4. The apparatus according to claim 3, wherein said principal member further comprises two divergent members each having a free end and said handle contrivance spans the free ends of said two divergent members to define a peripherally closed passageway collectively formed by the two divergent members and the handle.

5. The apparatus according to claim 1, in which said at least one or more extension sections of said T-shaped or cross-shaped stake comprise at least one or more angled portions.

6. The apparatus according to claim 5, in which said first impact surface comprises a first wedged impact surface that is configured to engage at least one of said angled portions of said at least one or more extension sections of said T-shaped or cross-shaped stake.

7. The apparatus according to claim 6, in which said second impact surface comprises a second wedged impact surface that is configured to engage said at least one of said angled portions of said at least one or more extension sections of said T-shaped or cross-shaped stake.

8. The apparatus according to claim 7, further comprising an auxiliary handle.

9. The apparatus according to claim 7, in which said stake implement further comprises at least one of a T-shaped stake and a cross-shaped stake, wherein said T-shaped or cross-shaped stake further comprises a round shaped upper and lower shaft.

10. The apparatus according to claim 9, wherein said at least one or more extension sections are positioned about 2" inches below a topmost end of said round shaped upper shaft where said round shaped upper shaft and round shaped lower shaft meets.

11. The apparatus according to claim 7, wherein said cross-shaped stake further comprises a square shaped upper shaft and lower shaft.

12. The apparatus according to claim 5, wherein said at least one or more extension sections are positioned about 2" inches below a topmost end of said shaft section.

13. The apparatus according to claim 5, wherein an angle of each of said at least one or more angled portions comprises approximately 15 degrees incline.

14. The apparatus according to claim 13, wherein each of said at least one or more extension sections extends to around ⅜" inch on both sides shaft section.

15. The apparatus according to claim 1, wherein said first side is available for sliding contact with said at least one of said special purpose stake, whereby said principal member is operable to be accelerated on a generally straight line along said first side while sliding against said special purpose stake so that a significant impact is generated upon contact of said first engagement member and said second engagement member with said special purpose stake.

16. A system comprising:

means for supporting a foundation member or ancillary structure;

means for prying or removing said foundation member or ancillary structure supporting means;

a first engagement member;

a second engagement member;

a principal member disposed on said prying or removing means, in which said principal member having a first side and a second side;

a handle contrivance; and wherein said first engagement member and said second engagement member are on said first side principal member, which said handle contrivance being located only on said second side of said principal member, and Wherein said first side is available for sliding contact with said at least one of special purpose stake, whereby said principal member is operable to be accelerated on a generally straight line along said first side while sliding against said supporting means so that a significant impact is generated upon contact of said first engagement member and said second engagement member with said supporting means.

17. A system comprising:

a stake implement, in which said stake implement comprises:
at least a shaft section;
at least a head portion; and
wherein said head portion comprises at least one or more extension sections;

a stake removal apparatus having a principal member, in which said principal member comprises:
a first side;
a second side;
a handle end; and
a handle contrivance a first engagement member, said first engagement member comprises:

at least a first impact surface; and a first lever contact surface;

a second engagement member, said second engagement member comprises:

at least a second impact surface; and a second lever contact surface;

wherein said first engagement member and said second engagement member are located on said first side of said principal member, and wherein said first side is available for siding contact with said at least one of said special purpose stake, whereby said principal member is operable to be accelerated on a generally straight line along said first side while sliding against said special purpose stake so that a significant impact is generated upon contact of said first engagement member and said second engagement member with said special purpose stake;

wherein said first impact surface is configured to contact said at least one or more stake head extension sections;

wherein said second impact surface is configured to contact said at least one or more stake head extension sections;

wherein said first lever contact surface is configured to contact said at least one or more stake head extension sections; and wherein said handle contrivance is located only on said second side of the principal member.

18. The apparatus according to claim 17, in which said at least one or more extension sections of said head portion comprise at least one or more angles portions, wherein an angle of each of said at least one or more angled portions comprises approximately 15 degrees.

19. The apparatus according to claim 18, wherein each of said at least one or more extension sections generally extends to around ⅜" inch on both sides where said upper and lower shaft meets.

* * * * *